(12) United States Patent
Mohr (10) Patent No.: US 7,891,187 B2
(45) Date of Patent: Feb. 22, 2011

(54) MULTI-CHAMBER HEAT ACCUMULATOR FOR STORING HEAT ENERGY AND FOR GENERATING ELECTRICAL ENERGY

(76) Inventor: Peter Mohr, Pilatus Straβe 6, 81825 München (DE)

( * ) Notice: Subject to any disclaimer, the term of this patent is extended or adjusted under 35 U.S.C. 154(b) by 874 days.

(21) Appl. No.: 11/776,503

(22) Filed: Jul. 11, 2007

(65) Prior Publication Data

US 2008/0016866 A1 Jan. 24, 2008

Related U.S. Application Data

(63) Continuation of application No. PCT/DE2006/000018, filed on Jan. 9, 2006.

(51) Int. Cl.
*F03G 7/00* (2006.01)
(52) U.S. Cl. ........................ 60/641.2; 60/659
(58) Field of Classification Search ..... 60/641.2–641.4, 60/659, 649, 651, 671
See application file for complete search history.

(56) References Cited

U.S. PATENT DOCUMENTS

| 4,139,056 | A | | 2/1979 | Scholl | |
|---|---|---|---|---|---|
| 4,182,409 | A | * | 1/1980 | Robinson, Jr. | ......... 165/104.14 |
| 4,194,496 | A | * | 3/1980 | Carlson | ............ 126/620 |
| 4,265,224 | A | | 5/1981 | Meyer | |
| 4,280,482 | A | | 7/1981 | Nilsson, Sr. | |
| 4,397,152 | A | * | 8/1983 | Smith | ............ 60/641.15 |
| 4,489,563 | A | | 12/1984 | Kalina | |
| 4,524,756 | A | * | 6/1985 | Laverman | ............ 126/400 |
| 4,604,867 | A | | 8/1986 | Kalina | |
| 6,701,914 | B2 | | 3/2004 | Schwarz | |
| 6,910,334 | B2 | * | 6/2005 | Kalina | ............ 60/651 |
| 2003/0000680 | A1 | | 1/2003 | Schwarz | |

FOREIGN PATENT DOCUMENTS

| DE | 24 39 028 A1 | 2/1976 |
|---|---|---|
| DE | 36 05 466 A1 | 8/1987 |
| DE | 42 06 695 A1 | 9/1993 |

(Continued)

OTHER PUBLICATIONS

International Search Report for PCT/DE2006/00018, Jun. 13, 2006, 2 pages.

*Primary Examiner*—Hoang M Nguyen
(74) *Attorney, Agent, or Firm*—Christensen O'Connor Johnson Kindness PLLC (57) ABSTRACT

A multi-chamber heat accumulator for storing heat energy as well as for generating electrical energy comprises a pit structure having a bottom, a sidewall, and a cover. The pit structure comprises at least one inner zone with a first solid matter pit filling and at least one outer zone with a second solid matter pit filling. The outer zone at least partially surrounds the inner zone, the pit filling of the inner zone being separated at least in parts from the pit filling of the outer zone by at least one partition wall. The inner zone comprises at least one first pipeline system with at least one inlet to the inner zone and at least one outlet from the inner zone for passing fluids through, which is present at least in parts in the first pit filling material of the inner zone. A method for generating electrical energy is also disclosed.

25 Claims, 4 Drawing Sheets

FOREIGN PATENT DOCUMENTS

| | | |
|---|---|---|
| DE | 43 41 858 A1 | 6/1995 |
| DE | 103 01 807 A1 | 7/2004 |
| EP | 0694678 B1 | 1/1996 |
| EP | 1 259 774 B1 | 11/2002 |
| EP | 1 431 695 A2 | 6/2004 |
| EP | 1 439 362 A2 | 7/2004 |

* cited by examiner

MULTI-CHAMBER HEAT ACCUMULATOR FOR STORING HEAT ENERGY AND FOR GENERATING ELECTRICAL ENERGY

FIELD OF THE INVENTION

The present invention relates to a multi-chamber heat accumulator for storing heat energy as well as for generating electrical energy. Furthermore, the invention relates to a method for generating electrical energy by means of the multi-chamber heat accumulator embodying the invention.

BACKGROUND

Energy supply in the form of regenerable energy is subject to strong temporal fluctuations. While solar energy fluctuates depending on the time of the day and the season, wind energy is subject to the general weather situation and the season. The demand for energy also varies strongly depending on the time of the day and the season. Since energy supply and energy demand frequently do not coincide, suitable means for energy storage are desired in order to compensate for fluctuations and to reduce peak loads for energy generation. While heat storage strategies have developed to some extent, like gravel/water storage, storage water heater, aquifer storage, and earth storage, storage of electrical energy continues to remain particularly difficult.

Suitable hot-water heat accumulators are described, for example, in German patent reference DE OS 24 39 028. Compared with conventional large heat accumulators, these heat accumulators are supposed to avoid heat losses by dividing a storage pond into several cells using dams or separation walls so that the cells can be filled, one after the other, with hot water upon loading and with cold water upon unloading, each time by displacing one with the other.

According to German patent reference DE 42 06 695 A1, an above-ground seasonal heat energy storage can use gravel or a mixture of soil and gravel as a heat storage medium and air as a heat transport medium. The heat storage medium is thermally isolated by a layer consisting of soil and straw.

German patent reference DE 43 41 858 A1 discloses an underground heat accumulator made of soil with a heat insulating sheathing of loose rock provided with a sealing substance. Energy is obtained from, or supplied to, the soil via an energy transport device extending through the upper section of the sheathing. Water, which is used as an energy transfer medium, is supplied centrally to the heat insulated soil body and also drawn from it again.

The heat accumulators known from the state of the art are suitable to satisfy a demand for heat, e.g., for heating drinking water or for room heating, independent of supply. In this respect, the multi-chamber heat accumulator described in German patent reference DE 103 01 807 A1 does not go beyond these known heat accumulator strategies either.

It is therefore desirable to be able to use heat accumulators which, besides their use as, e.g., conventional storage water heaters, could also be used for generating electrical energy. This need and other shortcomings in the state of the art are addressed by the multi-chamber heat accumulator and method for generating electrical energy described herein.

SUMMARY AND INITIAL DESCRIPTION

The following specification describes heat accumulators that not only allow thermal energy to be stored and obtained when required, but also electrical energy to be generated when required.

In at least one embodiment, a multi-chamber heat accumulator comprises a pit structure, preferably one embedded in the ground, a bottom, a sidewall, preferably circumferential, and a cover, whereby the pit structure comprises at least one inner zone with a first solid matter pit filling and at least one outer zone with a second solid matter pit filling. The outer zone at least partially surrounds the inner zone, whereby the pit filling of the inner zone is separated at least in parts from the pit filling of the outer zone by at least one partition wall. The inner zone comprises at least one first pipeline system with at least one inlet to the inner zone and at least one outlet from the inner zone for fluids to pass through, which is installed at least in parts in the filling material of the first pit filling of the inner zone.

The material provided for the pit filling of the inner and the outer zone generally fills the pit structure completely so that the underside of the cover rests on the pit filling. Consequently, it is typically not necessary that the separation walls and/or the sidewalls take over load-bearing functions or that separate supporting braces for supporting or carrying the cover be provided. At least the pit filling of the outer zone, which is also described as the second pit filling, is normally performed in such a way that a heat transfer medium, e.g. water, can flow straight through and pass on heat to the pit filling material or to absorb heat from it on its way to a drain. A cavity volume of preferably about 15 to 30% remains even in a pit filling that completely fills the outer zone of the second pit structure.

In an advantageous embodiment, the outer zone is filled with incompressible granular and/or stone chippings-like material as a second solid matter pit filling, particularly in grain sizes of 8-11 mm, $^{11}/_{16}$ mm, and/or $^{11}/_{22}$ mm.

The inner zone is filled with material as a solid matter pit filling, also called first solid matter pit filling or first pit filling, the grain size of which, on an average, is smaller than that of the outer zone, such as sand, or which comprises a compact structure at least section-wise. Generally, it has proved to be sufficient if the second pit filling material for the outer zone is a coarse-grained gravel, broken waste building material, e.g. of concrete or bricks, high-density slag, e.g. electric furnace slag, or otherwise unusable overlying rock strata from quarries, or any mixture of the aforementioned materials.

The pit material of the inner zone preferably comprises incompressible granular and/or stone chippings-like material in grain sizes of $^{0}/_{2}$ mm, $^{2}/_{5}$ mm, and/or $^{5}/_{8}$ mm. Consequently, this pit material also comprises mixtures of $^{0}/_{8}$ mm and $^{2}/_{8}$ mm grain sizes. Sand or stone chippings (>$^{0}/_{2}$ mm) of the previously mentioned grain sizes are sufficiently known to persons skilled in the art. Furthermore, the inner zone can also be filled alternatively or additionally with dust materials, at least partly. Slag from copper smelting works and/or electric furnace slag, preferably in grain sizes of $^{0}/_{2}$ mm, $^{2}/_{5}$ mm, and/or $^{5}/_{8}$ mm, is particularly preferred material for the pit filling of the inner zone.

As a matter of course, the first pit filling of the inner zone can also comprise, at least in parts, material of a grain size of, e.g. $^{8}/_{11}$ mm. Furthermore, it is possible that the pit filling material of the inner zone comprises a compact structure, at least in parts, which is, e.g., pressed, sintered, or in the form of one or several monolithic blocks. In principle, any material of high heat storage capacity, particularly for temperatures in the range of 120° to 250° Celsius, can be used as pit filling material for the inner zone. It is particularly advisable to take care that the first and/or second pipeline system is in direct contact, as far as possible, with the pit filling material so that heat can be transferred in an unobstructed way and as effective as possible. The pit filling material of the inner zone is preferably full-facedly and compactly in contact with the walls of the first and the second pipeline system, respectively. As a rule, the finer the pit filling material, the better will be the desired heat transfer.

The partition wall between the inner and the outer zone can be, e.g., a wall made of stone, concrete, metal, and/or synthetic material, particularly a synthetic material resistant to pressure, and/or a plastic film. In an advantageous embodiment, this partition wall is made fluid-tight and, if necessary, also fluid-tight joined to the bottom and/or the sealing layer. The multi-chamber heat accumulator embodying the invention is therefore preferably characterized by the fact that at least one partition wall seals off the inner and the outer zone against each other to make these fluid-tight and/or thermally insulated.

The partition wall between the inner and the outer zones is preferably made of stone, particularly basalt stone, concrete, and/or metal. For the purpose of thermal insulation, this partition wall can furthermore comprise an insulating layer, for example comprising glass wool. Due to the high storage temperature provided for the inner zone, which can be in the range of 120° to 250° Celsius and is preferably adjusted to a temperature range from 150° to 180° Celsius, plastic materials are typically not used as a material for the partition wall between the inner and the outer zone. Instead, mineral substances are preferably used for this partition wall.

It is generally sufficient if the outer zone surrounds or encloses the inner zone only partially. For example, the outer zone can enclose the inner zone at the side fully peripherally, however, without also covering the underside and/or top side of the inner zone. Furthermore, it is also possible that the outer zone surrounds the sides, the sidewalls, or side faces of the inner zone only partially.

In a further embodiment the outer zone encloses not only the sides of the inner zone at least partially, but also the top side and/or the underside, preferably essentially completely. The outer zone can thereby be positioned lateral to the inner zone, at least in parts, and below the inner zone, in each case lateral, at least in parts, and above the inner zone, at least in parts, or in each case lateral, at least in parts, under and above in relation to the inner zone. If desired, the outer zone can completely surround said inner zone. In this case, it has proved to be advantageous to separate the top side of the inner zone and/or the underside of the inner zone from the outer zone or the filling material of the outer zone, particularly by an essentially horizontal partition wall, to make these fluid-tight and preferably also thermally insulated. The abovementioned preferred embodiment is particularly well suited to minimize heat losses of the inner zone or to benefit from such heat losses immediately for the outer zone. As a matter of course, it is also possible to segment the inner zone by installing further partition walls.

Furthermore, the heat accumulator described herein also provides for subdividing the pit filling of the outer zone into at least two or several partial zones by at least two partition walls and/or at least one circumferential partition wall.

Said partition walls, which subdivide the pit filling, can be arranged, for example, side by side, particularly essentially in parallel to each other. Said partition walls can also be arranged cross-wise and/or peripherally, particularly circumferentially. The segmented heat accumulator obtained by providing partition walls between the inner and the outer zone and, if necessary, also within the outer zone, comprises storage cells that are preferably mutually heat insulated to minimize entropy losses by specific feeding and drawing of water at the different temperatures of the storage segments.

A multi-chamber heat accumulator embodying the invention is preferably realized in such a way that a temperature profile is obtained in which the temperature of the inner zone is higher than the temperature of the outer zone and in which the temperatures decrease from inside to outside, if the outer zone is segmented, too. The heat accumulator preferably has temperature zones that are largely isothermal. Moreover, it is possible to provide insulations of different heat conductivity for the partition walls, for example, by means of material variations and/or by different thicknesses of the insulating material, particularly also in different places or depths of the pit filling. Depth-dependent pressure load requirements can thus also be taken into account. The heat accumulator according to the invention can comprise separate zones with storage volumes from a few 100 cubic meters to several 1000 cubic meters of pit filling. As a matter of course, it is also possible to operate individual or all storage zones empty of liquid, which helps to reduce heat conduction to the surrounding zones and results in increased long-term storage capacity. For example, it is possible to subdivide the outer zone, particularly with large-volume storages, e.g., with an outer zone of 10000 m3 or more, into approximately up to 30 partial zones, for instance, 3 to 20 partial zones, which can preferably be operated separately. In a further embodiment, a heat accumulator according to the invention also can have an outer zone which comprises an outer peripheral partial zone, an inner partial zone adjacent to the inner zone, and, at least in parts, an interjacent partial zone. Generally, it has proved to be advantageous to operate the outer peripheral partial zone at temperatures in the range of 55° to 75° Celsius in the drawing state, the inner partial zone at a temperature in the range of about 90° to 100° Celsius in the drawing state, and the partial zone which is located in the middle between the peripheral partial zone and the inner partial zone at a temperature in the range of 75° to 90° Celsius in the drawing state. It also has often proved to be advantageous to use the aforementioned temperature profile with outer zones which have more than three partial zones. If, for example, an outer zone comprises altogether ten partial zones that are preferably arranged from outside to inside, the two outer zones can be operated at a uniform temperature, e.g., in the range of 55° to 75° Celsius, while the adjacent six middle partial zones can be operated at a temperature in the range of 75° to 90° Celsius, and the innermost two partial zones of the outer zone can be operated at a temperature in the range of 90° to 100° Celsius. When obtaining thermal energy from the partial zones, it has proved to be advantageous to let the temperature of the partial zone not drop essentially under 40° Celsius.

While fluid is immediately supplied to the outer zone for heat transfer, the inner zone is heated by running fluid through a first pipeline system embedded in the pit filling material of the inner zone. In such a way, it is possible to heat up the inner zone to temperatures in the range of 100° Celsius and above. For this purpose waste heat, e.g., from industrial production processes, can be used. Thermal energy from biomass thermal power stations or from geothermal energy sources or the hot exhaust fume current from burning processes or from melting furnaces can also be used for heating the inner zone via the first pipeline system. Furthermore, air liquefaction plants also deliver heat quantities with temperatures far over 100° Celsius and can therefore be taken into account for heating the pit filling material of the inner zone. The first pipeline system should therefore be realized in such a way that it withstands pressures in the range of up to 30 bar and temperatures up to 250° Celsius in continuous operation without any problem. Provided that the fluid used in the first pipeline system is highly purified water, e.g., condensed water, which moreover cannot come into contact with the atmosphere, steel tubes are normally sufficient for the first pipeline system.

A second pipeline system laid through the inner zone can be provided, e.g., to raise the temperature of water, particularly already preheated, e.g., taken from the outer zone of the heat accumulator, by passing it through the inner zone, thereupon to be used for generating electrical energy. As a matter of course, the first pipeline system can also be used to this end. As a rule, the second pipeline system does not have to withstand pressures in the range of 25 to 30 bar. It has rather proved to be suitable to pass the water to be heated in the inner zone through the second pipeline system at a pressure of, e.g., not more than 15 bar, suitably of about 10 bar. Provided that the fluid passed through the second pipeline system is not highly purified water but, for example, water taken from the outer zone of the heat accumulator, it has proved to be advantageous to use high-grade steel tubes or copper tubes for the second pipeline system. Therefore, the inner zone can have at least one second pipeline system with at least one inlet to the inner zone and at least one outlet from the inner zone for passing through fluids and which is laid at least in parts of the material of the first pit filling of the inner zone.

Preferably there is coupled with the outlet of the first and/or the second pipeline system at least one system for carrying out a Kalina process, e.g., a first system for carrying out a closed gas turbine process in which inert gas, for example, nitrogen, carbon dioxide, or a noble gas, is compressed and heated in a gas heater and subsequently expanded in a gas turbine, and/or a system for carrying out an ORC process. Said processes are based on closed-loop systems which can use compressors, gas turbines, vaporizers, condensers, and regenerators.

In an ORC (Organic Rankine Cycle) process, a readily volatile organic compound is vaporized in a vaporizer and expanded as a gaseous work fluid in a turbine, whereby the exhausted gaseous work fluid is then condensed in a condenser to be reused.

In the basic Kalina process, at first heat available at a relatively low temperature is used to carry out partial distillation of at least one part of a multi-component fluid current at an intermediate pressure in order to obtain work fluid fractions of different compositions. One of these fractions is relatively richer in a low-boiling component whereas in another fraction the concentration of the low-boiling component is lower. The fraction or solution which is richer in the low-boiling component is then exposed to pressure and thereupon vaporized to obtain the gaseous work fluid which drives a gas turbine. The expanded work fluid can thereupon be condensed in a condenser and combined with the fraction of a lesser content of the low-boiling component. The basic Kalina process is also described in detail in the U.S. Pat. No. 4,489,563, the disclosure of which is incorporated herein by reference. In at least one embodiment, ammonia may be used as the low-boiling component, while water is used as the higher-boiling component of the mixture.

As a matter of course, further developments of the Kalina process can also be used in the case in hand. For example, as disclosed in the U.S. Pat. No. 4,604,867, incorporated herein by reference, the work fluid can be supplied to a re-heater after initial expansion in the turbine to obtain the temperature required for overheating and then be recycled to the turbine and expanded there. As a matter of course, the Kalina process applied in accordance with the present invention may also comprise a further development described in European Patent No. EP 694 678 B1, incorporated herein by reference, according to which a first current which has a higher content of low-boiling component than the condensed current, a second current which has a lower content of a low-boiling component than the condensed current, and a third current which has the same content of a low-boiling component as the condensed current, are produced, whereby the first, second, and third current are subject to multiple distillation processes to produce a liquid work fluid that can then be vaporized.

The ORC system also comprises a steam turbine in which a work medium is expanded. To be able to use low temperatures for electricity generation, an organic heat carrier which already vaporizes at low pressure and low temperature is used as a work fluid or work medium instead of water. Suitable ORC work media are, for example, readily volatile hydrocarbons like isopentane and isooctane and mixtures thereof as well as readily volatile silicone oils. Furthermore, readily volatile hydrocarbons that are partially or completely halogenated like perfluoropentane can also be used alternatively or in addition. This class of compounds is also known under the name of frigenes. With these work media, temperature ranges from about 90° to 300° Celsius can be used for the generation of electrical energy in an ORC system.

At least one discharge pipe, which is connected to the supply pipe, can be provided for drawing off the cooled down fluid used for the evaporation. Preferably, said supply pipe therefore passes into the discharge pipe downstream from the vaporizer. In a further embodiment of the invention, it is furthermore provided that the discharge pipe is connected to the inlet pipes of the outer zone or the partial zones of the outer zone.

According to another aspect of the present disclosure, it is suggested that at least in a second system for carrying out a closed-loop gas turbine process, in which inert gas, particularly nitrogen, carbon dioxide, and/or noble gases, can be compressed, heated up in a gas heater, and expanded in a gas turbine stage. The gas heater of said second system should comprise at least one section of the discharge pipe and/or the cooling system.

The previously described systems for carrying out closed-loop turbine processes have the advantage that even the thermal potential of relatively small temperature differences can be exploited for generating energy. Said systems regularly use compressors, gas turbines, vaporizers, condensers, and regenerators.

According to another aspect of the present disclosure, the outlet of the first and/or the second pipeline system can also be coupled with any additional systems that can drive, preferably in a closed-loop system, gas turbines by evaporation of readily volatile components or liquefied gases. By way of example, reference is made to the closed-loop gas turbine process according to German Patent No. DE 36 05 466 A1, where inert gases like nitrogen or carbon dioxide or preferably noble gases like xenon are compressed, heated indirectly in a gas heater and then expanded in a gas turbine stage in a closed-loop process. Furthermore, these expanded but still high-energy gases can be supplied to a high-pressure fusion reactor where they merge with a work medium, such as water, a frigene, or any other stable medium which can be preheated, or with the vapour of which, whereby the work medium vaporizes and overheats or its vapour overheats, and the mixture is supplied to a second gas turbine stage for expansion. The production of liquefied gases, e.g., according to Linde's process, is known to persons skilled in the art. Said processes can be readily implemented when using a heat accumulator according to the present disclosure. On the one hand, heat arising in the gas liquefaction process can be used for heating up the inner zone, while the liquefied gases, if required, can be used as expanded work fluid for driving a gas turbine by controlled supply of thermal energy from the inner zone of the heat accumulator.

The liquefied gases, e.g., liquefied air or the inert gases obtained from it, can be very elegantly used by a heat accumulator described herein, as the energy needed for the liquefaction of gas can be won from surplus energy. For example, surplus energy may arise as unused off-peak electricity or as a result of overcapacities in power stations. Liquefied gases can also be easily transported and stored over longer time periods and, therefore, can be readily used with a heat accumulator as described herein.

Furthermore, multi-chamber heat accumulators may be characterized by the bottom comprising at least one heat insulating layer and/or at least one sealing layer, particularly installed above the heat insulating layer, particularly an essentially waterproof flexible plastic sealing foil, and by the side wall comprising at least one heat insulating layer and/or at least one, particularly inner, sealing layer, and/or by the cover layer of the pit structure comprising at least one heat insulating layer and at least one sealing layer installed above the insulating layer.

Lengths of plastic material, as they are well-known from tunnel construction, can be used as suitable sealing layers, for example. Preferably, thermoplastic flexible plastic foils are used, particularly preferred being polyethylene foils of, e.g., LD-PE, LLD-PE, or HD-PE. Using a biaxial LD LD-PE foil has proved to be particularly advantageous. Flexible polyolefine foils, particularly those of a partially crystal structure, with glass fleece reinforcement, if necessary, are also frequently used for attainment of improved dimension stability. Such reinforcement can be, e.g., the inner layer of a co-extruded foil. Suitable sealing membranes can be obtained, e.g., from Sarnafil GmbH and Feldkirchen, under the names of MP 970, MP G 950, and MC G 770. In principle, the sealing layer of truck foils can also be used.

Adjacent foamed bodies, particularly large-sized and/or closed-pore hard foam material blocks, and particularly comprising at least one layer each time, can be used as the heat insulating layer of the sidewall and/or as the cover. Suitable hard foam material blocks preferably contain expanded polystyrene.

Furthermore, the heat insulating layer of the bottom can be planned to comprise at least one layer of, particularly adjacent, foamed bodies, particularly large-sized and/or closed-pore hard foam blocks and/or at least one layer made of mineral insulants, particularly foamed glass, foamed clay, and/or foamed slate.

Blocks of extruded closed-pore polystyrene hard foam (EPS), as they are known, for example, from the construction of traffic banks on soft underground, are preferentially used for thermal insulation. Suitable foamed bodies have a bulk density of about 10 to 20 kg/m3 for the surfaces of the bottom and the side walls, and a bulk density of about 20 to 30 kg/m3 for the insulating layer and the cover. The compressive strength of these insulating materials is generally sufficient without any problem for construction heights of earth trough storages up to approximately 8 m. With greater construction heights, it is advisable to use mineral insulating layers, particularly in the bottom.

Furthermore, the multi-chamber heat accumulators preferably have at least one fluid inlet tube, particularly adjacent to the underside of the inner sealing layer of the cover, for supplying fluid to the outer zone or to a partial zone of the outer zone and/or at least one fluid outlet pipe, particularly on the bottom or adjacent to it, for drawing fluid from the outer zone.

According to another aspect, the multi-chamber heat accumulator has at least one sealing layer on the exterior surface of the bottom and/or the sidewall or in the area of it, at least one seepage layer installed at least in parts outside said sealing layer in the bottom area and/or sidewall area, particularly comprising a cavity-rich granular material layer and/or at least another sealing layer to limit the seeping layer downward and/or sideward. It is particularly advantageous if the seeping layer is effectively connected with the drainage layer of the cover and/or comprises at least one drain pipe.

According to another aspect, the multi-chamber heat accumulator is characterized by an essentially fluid-tight trough structure and or membrane trough which surrounds the pit structure to keep groundwater away from it, whereby the trough structure and/or the pouring between the bottom and/or the sidewall of the pit structure and the interior wall of the trough structure and/or the membrane trough comprises ballast material, particularly coarse-grained electric furnace slag.

Although there is the possibility of installing multi-chamber heat accumulators on the ground of areas of a high ground-water table, this frequently impairs the sight of a place or landscape. With the embodiment as explained above, multi-chamber heat accumulators according to the present disclosure can now be installed also at places of a high ground-water table without any problem. A multi-chamber heat accumulator with a coarse-grained bottom layer adjacent to the outer wall of the trough structure and/or the membrane trough at least in parts and at least one protective fleece and/or tissue surrounding said layer has proved to be particularly advantageous.

In another embodiment, heat accumulators also have at least one operating and/or control unit, comprising at least one circulating pump, one heat exchanger and/or one inlet and outlet control, particularly a valve and/or spray tube control.

Furthermore, multi-chamber heat accumulators embodying the invention can comprise at least one pond situated, at least partly, on the cover and/or, particularly in the soil, above the cover.

A preferred embodiment is characterized by the fact that the arranged partition wall or the partition walls, respectively, are inclined and/or essentially vertical, at least in parts, and extend essentially from the cover, particularly under formation of an essentially fluid-tight joint to it, to the bottom.

Another embodiment provides for at least one opening in the partition wall, particularly in the bottom area.

Another advantageous embodiment can provide for at least one partition wall and/or one sealing layer, particularly one adjacent to the partition wall, to be joined to the bottom at least in parts, particularly fluid-tight, under formation of closed zones.

Multi-chamber heat accumulators as disclosed herein may also be characterized by the fact that at least one partition wall and/or one sealing layer, particularly one adjacent to the partition wall, divides the pit structure into fluid-tight and/or thermally insulated zones between which essentially no free exchange of fluid and/or heat energy takes place. For example, an inner partial zone of the outer zone can be thermally sealed off and delimited from peripheral zones of the outer zone by installing circumferentially a vertical insulation layer welded to the bottom insulation. Such fluid-tight delimited partial zones are operated independently of each other so that each of these partial zones disposes at least of one inlet and one outlet.

An alternative embodiment provides that at least one partition wall and/or sealing layer is arranged at least in parts essentially horizontally, particularly with partitioning the pit filling into an upper and a lower area. By installing also a horizontal partition wall or sealing layer in the pit filling, a further storage zone can be formed, e.g., in addition to the vertically arranged storage zones above or below these zones, particularly functioning as a peripheral zone. Furthermore, it is possible also to segment said horizontal storage zone by attaching vertical partition walls and/or sealing layers.

The inner sealing layer can be fluid-tightly joined to the sidewall insulation or drawn up tightly at the sidewall, at least in parts.

Furthermore, it is advantageous if the multi-chamber heat accumulator comprises at least one fleece, geotextile and/or mineral protective coating installed above the sealing layer of the bottom, at least in parts. To protect the liquid-tight sealing layer from damage by the granular or splinter-like pit filling material laid on the bottom, installing chemically inert and water-neutral protective layers on the topmost sealing layer of the bottom is often an adequate solution.

In a particularly useful embodiment, the multi-chamber heat accumulator has at least one fluid outlet pipe, particularly a drainpipe, installed adjacent to the bottom or on the bottom or in the bottom, particularly in a depression, of the pit structure, and/or at least one inlet pipe, particularly comprising a spray pipe or at least one spray nozzle, installed below the cover or adjacent to it. Heat is supplied to the storage or to the storage zones preferably by spraying water over the surface of the storage filling. Thus, the heat is very evenly supplied to the individual partial zones and the temperature is very evenly distributed in the pit filling from the cover to the bottom.

It can be planned that every partial zone has at least one outlet pipe and/or at least one inlet pipe.

Suitable multi-chamber heat accumulators also have at least one steam diffusion barrier layer below the heat insulating layer of the cover, particularly a protective fleece laminated with an aluminum foil and/or at least one protective fleece above the sealing layer of the cover, a textile cover layer, (co-)extruded plastic foil, drainage layer, soil layer, and/or humus layer.

Further disclosed herein is a method for generating electrical energy, comprising the following steps:
a) Providing a multi-chamber heat accumulator according to any of the present disclosure,
b) Supplying energy to the inner zone via the first pipeline system by means of heated fluid passing through it so that the temperature of the inner zone amounts to at least 110° Celsius,
c) Utilizing the thermal energy supplied to the inner zone and stored for vaporizing a work fluid, particularly a mixture of ammonia and water or for vaporizing liquid and readily volatile organic compounds or for vaporizing liquefied inert gases,
d) Driving at least one steam turbine by means of the vapour developing in the evaporation process, and
e) Transforming the kinetic energy of the moving steam turbine into electrical energy.

Steps c), d), and/or e) can be planned to be constituents of the Kalina process or the ORC process.

In accordance with another aspect, the method provides that the heated fluid to be used for evaporating the work fluid is fed in through at least one discharge pipe after leaving the vaporizer for the outer zone, particularly a partial zone at a temperature below the temperature of the fluid to be fed in.

Hereby, it is furthermore suggested that the cooling system or the discharge pipe is used to operate a closed-loop gas turbine process with heating condensed and liquefied inert gases, particularly nitrogen, carbon dioxide, and/or noble gases, via the cooling system and/or the discharge pipe and expanding these subsequently in a gas turbine stage. The residual thermal energy of the expanded work fluid which has left the gas turbine or of the fluid originating from the inner zone which was used for the evaporation of said work fluid is utilized in the previous embodiment for starting a second gas turbine process. The first or main gas turbine process is preferably a Kalina or ORC process. A heat accumulator can therefore also comprise a system for carrying out a closed-loop gas turbine process in addition to a Kalina or ORC system for compressing inert gases, particularly nitrogen, carbon dioxide, and/or natural gases, heating these in a gas heater and expanding them in a gas turbine stage, particularly as described in the German Patent No. DE 36 05 466 A1.

In another embodiment, the first pipeline system is used for supplying thermal energy to the inner zone while the second pipeline system is used for drawing thermal energy from the inner zone for vaporizing the work fluid.

Embodiments of the invention herein were based on the surprising finding that multi-chamber heat accumulators, besides their suitability for providing hot-water supply in line with demand, can also be used for generating electrical energy in line with demand.

Furthermore, it is advantageous that liquid can be drawn from the outer zone, particularly from the peripheral zones of said outer zone of the heat accumulator, as cooling water for condensing the expanded gaseous work fluid either to be used as hot-water or to be recycled to the outer zone of the heat accumulator.

DESCRIPTION OF THE DRAWINGS

In the following, an example of an embodiment of the invention is described in greater detail for better understanding with reference to the accompanied drawings in which.

DETAILED DESCRIPTION

Figure 1:
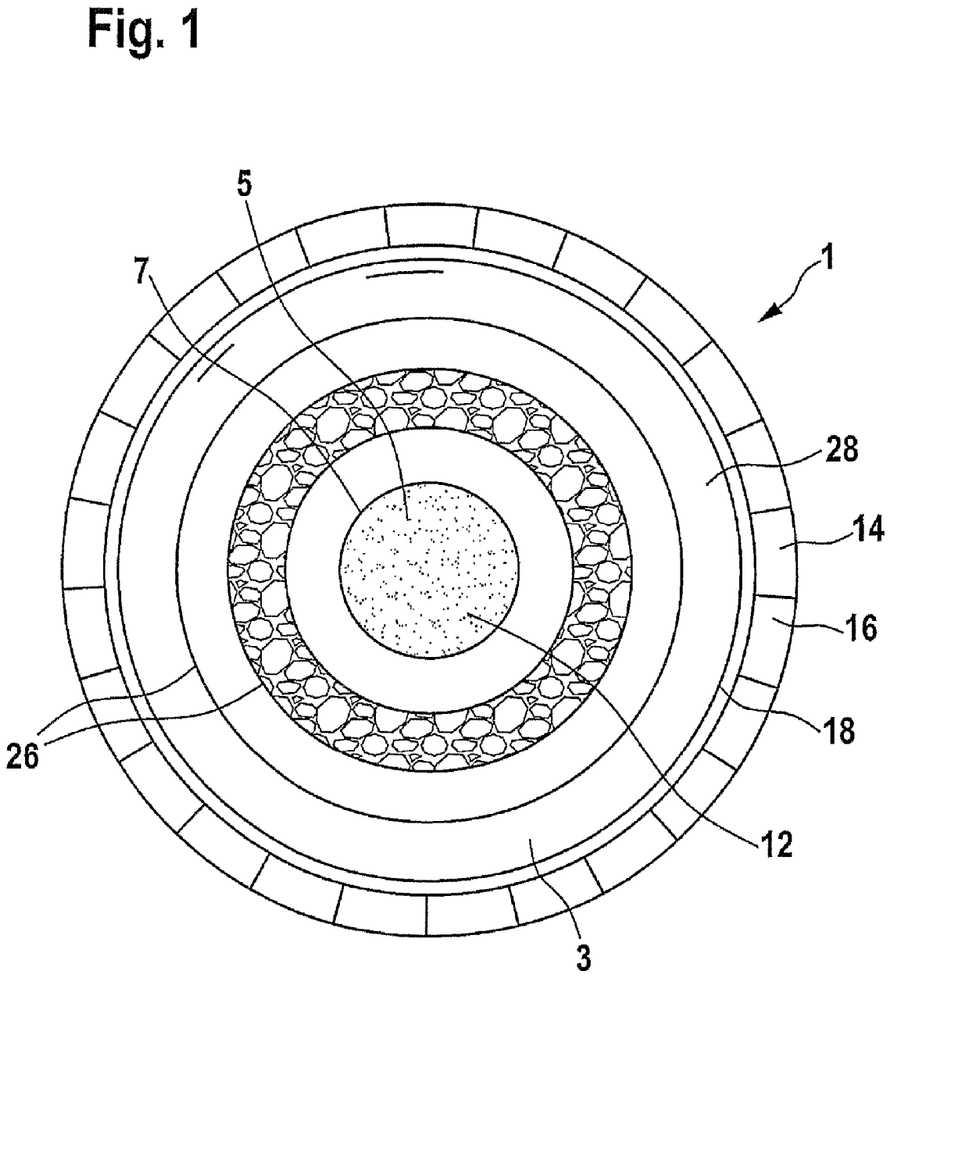
FIG. 1 is a perspective schematic top view of a multi-chamber heat accumulator.

FIG. 1 is a schematic top view of a multi-chamber heat accumulator 1 according to the invention. The sidewall 14 is provided with a heat insulating layer 16 made of hard foam blocks and an internal sealing layer 18 in the form of a plastic layer. Partition walls 26 subdivide the outer zone 3 into four separated partial zones 28. The partition walls 26 are circumferential and, thus, arranged as endless partition walls. The outer zone 3 surrounds an inner zone 5 with a pit filling 12 essentially made of very fine-grained material, e.g., sand. The inner zone 5 is detached from the outer zone 3 by a fluid-tight partition wall 7. The individual partial zones 28 are filled with a rather coarse-grained and stone chippings-like pit filling material 15 (shown exemplarily only for a partial zone). The interstices in the pit filling material can optionally be filled out with hot water. The temperature of the pit filling material 15 ideally increases in the partial zones from outside to inside, whereby the filling material 12 of the inner zone 5 shows the highest temperature. A first pipeline system 90 (not shown) containing a pipe inlet and a pipe outlet is embedded in the pit filling material 12 of the inner zone 5.

Figure 2:
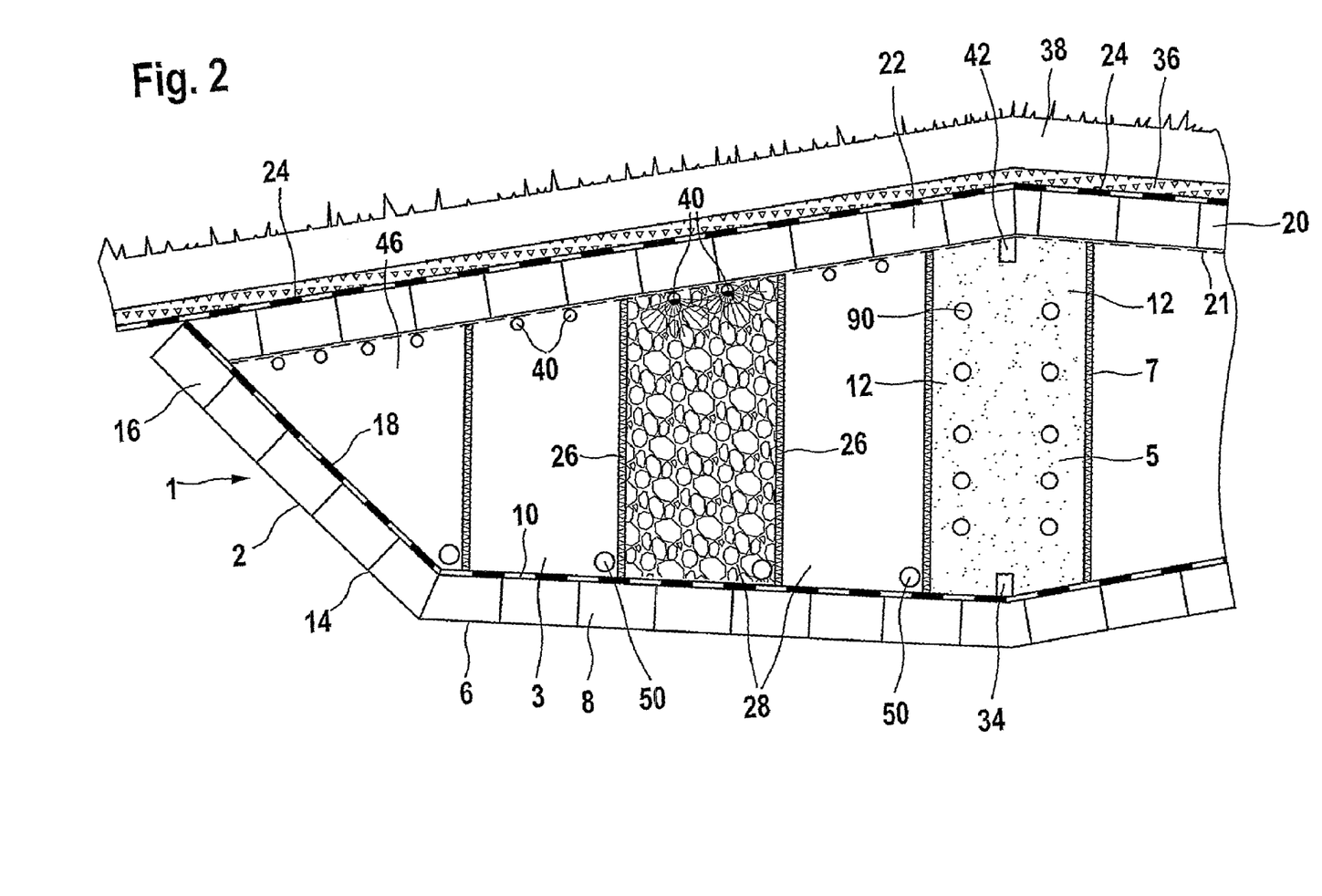
FIG. 2 is a schematic cross-sectional detail of the heat accumulator as shown in FIG. 1.

FIG. 2 is a cross-sectional view of a detail of a multi-chamber heat accumulator 1 according to the invention as shown in FIG. 1. The pit structure 2 of the heat accumulator 1 is buried in the soil 4 for the most part. The bottom 6 is inclined towards the centre of the pit structure and comprises an insulating layer of closed-pore hard foam blocks 8 and a sealing layer 10 lying on this insulating layer in the form of a plastic sealing membrane. The pit 2 is filled with pit filling material in the space formed by the floor 6, sidewall 14, and cover 20. The upper cover 20 preferably comprises a steam diffusion layer 21 and a heat insulating layer 22 formed for example of hard foam material blocks, and a sealing layer 24. A drainage protective layer 36, for example, can be installed on this with a protective coating 38, e.g., made of soil, applied on it. While the inner zone 5 is filled with a very fine-grained filling material 12, such as sand, the outer zone 3 which is surrounding the inner zone 5 is filled, for example, with coarse-grained gravel as a pit filling material 15. On account of a better overview, FIG. 2 does not show the pit fillings but for one of the partial zones 28 of the outer zone 3. The sealing layer 10 of the bottom can be provided with a geotextile and/or mineral protective layer (not shown) to protect it from damage by the overlying pit filling 12. Suitable hard foam blocks are, e.g., made of extruded polystyrene hard foam of a thickness in the range of about 0.2 to 1.5 m. In the embodiment shown in FIG. 2, the sidewall 14 is provided with a heat insulating layer of hard foam material blocks similarly to the bottom and with a sealing layer 18 in the form of a plastic layer. The sealing layer 18 is liquid-tightly joined to the sealing layer 10 of the bottom as well as to the sealing layer 24 of the cover 20 of the pit structure 2. The bearing surfaces of the bottom 6 and the sidewall 14 are regularly leveled and compacted prior to installing the hard foam material blocks. The partition walls 26 of the outer zone 3 regularly extend from the cover 20 lying on the pit filling to the bottom 6 or the sidewall 14. In the present embodiment, the partition walls 26 are made of heat insulating plastic boards provided shrink-wrapped in a plastic wrapping. Such a wall can also be used for the partition wall 7 between the inner and the outer zone. The partition walls 26 as well as the partition wall 7 are preferably fluid-tightly joined to the floor or the sealing layer lying on the bottom so that no fluid exchange can take place between the individual zones. The partial and peripheral zones 28, 46 thus obtained can be operated completely independently from each other. In such a case, every sealed-off partial zone is equipped with a drainage pipe 50. A first pipeline system 90 with an inlet pipe 42 and an outlet pipe 34 is arranged in the inner zone 5. The inlet pipe 42 is preferably installed in the upper area of the inner zone 5. In the case in hand, the first pipeline system 90 is spirally embedded in the fine-grained pit filling material 12 of the inner zone 5. As a matter of course, any alternative pipeline geometries are possible. The outlet pipe 34 is directly connected with the vaporizing unit of a system for carrying out a Kalina or ORC process (see also FIG. 3). The inner zone 5 can be heated up to temperatures above 80° Celsius, preferably above 100° Celsius, using, for example, industrial waste heat via the first pipeline system 90. The first pipeline system 90 offers likewise the possibility to use thermal energy stored in the inner zone 5 for heating fluids, for example, water, to be subsequently used for the generation of electrical energy, e.g., by means of the Kalina or ORC process. This fluid can be drawn as preheated fluid from the outer zone 3, particularly from one of the partial zones 28, via the drainage pipe 50.

In a standard operation mode, the respective cells or partial zones 28 of the outer zone 3 are not filled with water. Water normally only serves as a heat transfer medium by passing its heat energy on to the pit filling 12 of the respective zone whence it is drained off again by the drain pipe 50. Thus, the convectional thermal motions as they are known of cells filled with water do not occur. However, it is absolutely possible to fill the cavity volume of the pit filling also with hot water to store an even higher quantity of energy. It has generally proved to be useful if approximately between 30 and 50% of the free pore volume in the whole storage is filled with water. The heat supplied to the outer zone 3 of the heat accumulator as well as the subsequent heat abstraction are preferably realized by spraying water on the surface of the pit filling 15 by means of spray pipes 40. The temperature is thus very evenly distributed along the complete height of a storage zone 28 in a very speedy and effective way. Furthermore, the spraying method permits redistribution of the residual heat to other storage cells which are largely thermally emptied 28, since no direct reflux of water to the storage cells in the tapping status is necessary. Consequently, residual heat below the minimal temperature of single-chamber hot water heat accumulators can also be stored again as useable heat without any impairment of several storage zones.

The outer zone 3 of the multi-chamber heat accumulator with volume segments 28 which are thermally insulated from each other and operated individually permits, e.g., optimizing the close-range heat system. Provided that the individual storage cells are adequately adjusted to the heat sources available in terms of time, volume and temperature, and to the consumers to be supplied with heat, a varied and selective use of heat is possible. Within the pit structure, heat conduction related heat drains from inner high-temperature zones to outer low-temperature zones form a heat source for the storage of the exterior peripheral zones on a relatively low-temperature level. Moreover, the outer low-temperature zones minimize the temperature difference between the core zones, intermediate zones, and peripheral zones and the surrounding soil and, consequently, the heat loss of the whole system to the surrounding soil.

Figure 3:
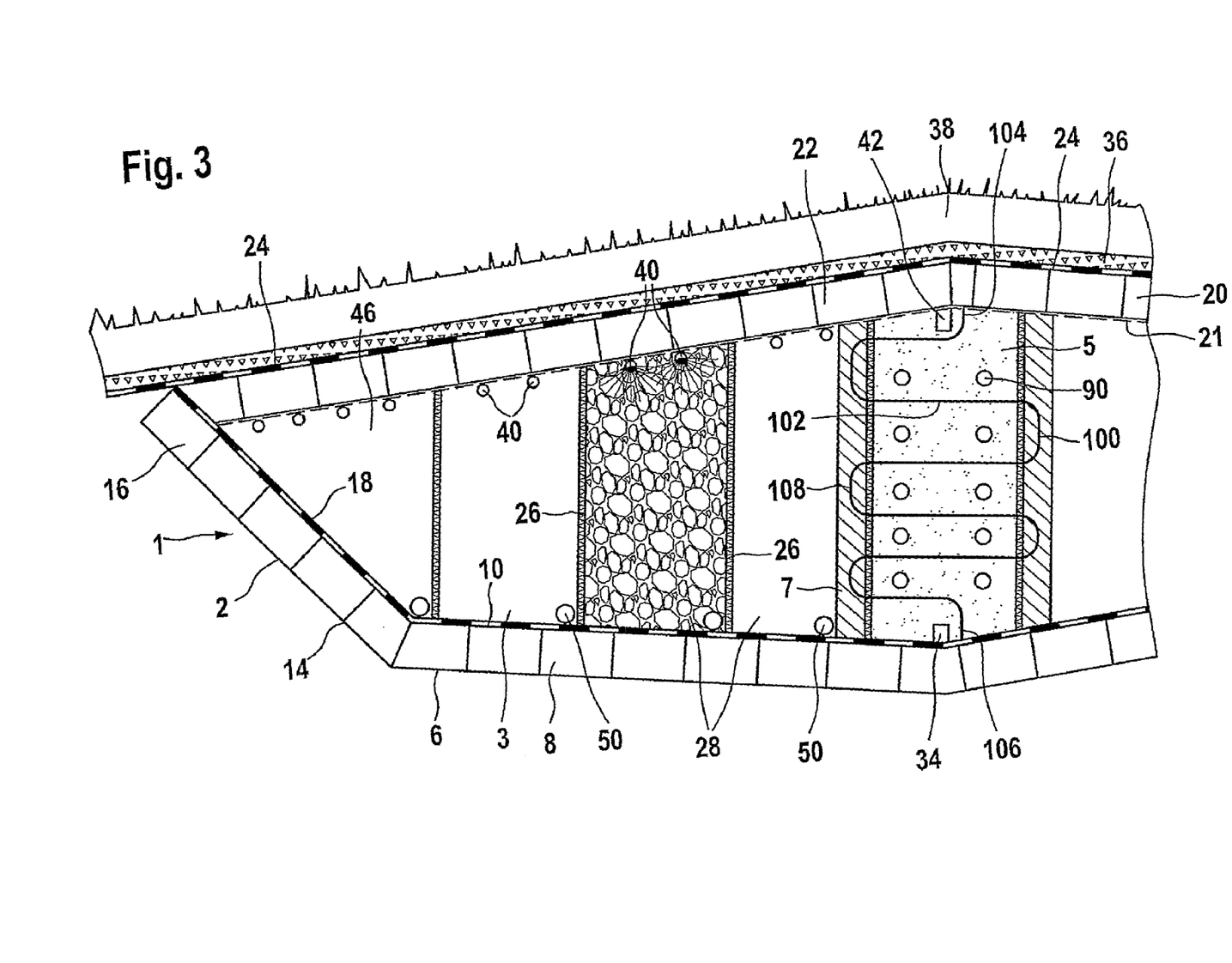
FIG. 3 is a schematic cross-sectional view of an alternative embodiment of a multi-chamber heat accumulator as shown in FIG. 1.

FIG. 3 shows a multi-chamber heat accumulator 1, whose inner zone 5, besides a first pipeline system 90 for the supply of thermal energy, also comprises a second pipeline system 100 for the absorption of thermal energy from the inner zone 5. The second pipeline system 100 has sections 102 in the inner zone which are essentially straight-lined and which are connected via manifold units 108 in the partition wall 7 between the inner and the outer zone. To avoid heat losses, the partition wall is thermally insulated from the outer zone. This design permits an exchange of faulty or leaky pipeline sections 102 in a particularly simple way without the necessity of exposing the inner zone. Fluid is supplied to the second pipeline system 100 in the inner zone through the inlet 104. As described already, the fluid transported in the second pipeline system 100 has a temperature which is lower than the temperature of the inner zone 5 and, therefore, abstracts thermal energy from the material of the inner zone 5 while being heated. Via the outlet 106, this heated fluid can then be supplied to, e.g., a Kalina system 200 by means of a supply pipe 214 for the purpose of generating electrical energy (see also FIG. 4).

Figure 4:
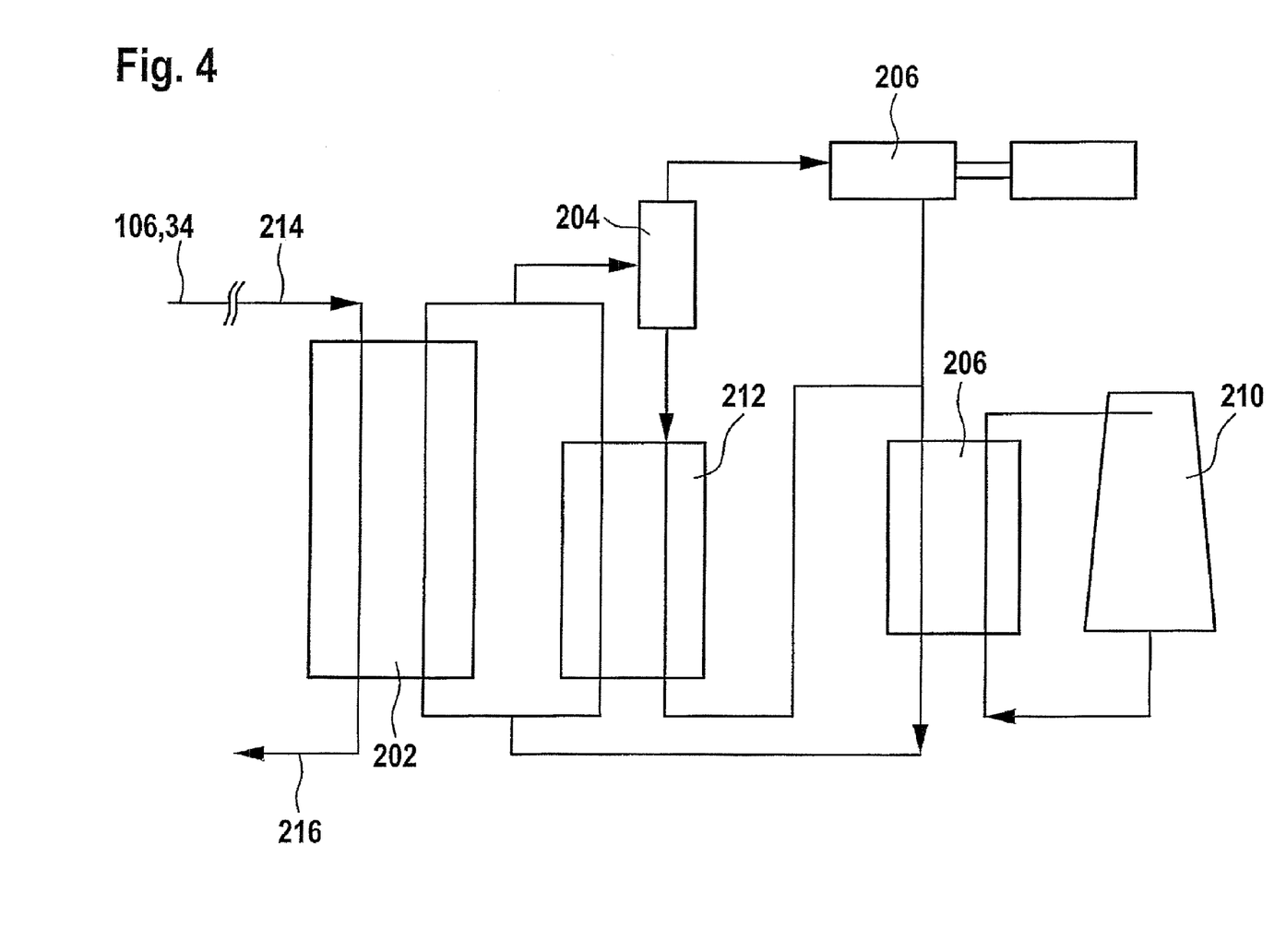
FIG. 4 is a schematic representation of a system for carrying out a Kalina process.

As can be seen from FIG. 4, such a system 200 comprises a vaporizer 202, a separator 204 to separate the more readily volatile component ammonia from the lower volatile component water, a gas turbine 206, a condenser 208, a cooling system 210, and a compressor 212.

The pipeline 214 can, e.g., be immediately connected with the outlet 34 of the first pipeline system 90 or with the outlet 106 of the second pipeline system 100 of the inner zone 5 to supply the vaporizer 202 with hot fluid. Hot fluid from the inner zone 5 is preferably drawn via the second pipeline system 100 while the first pipeline system 90 serves for supplying heat energy to the inner zone 5. The ammonia/water mixture is vaporized in the vaporizer and subsequently separated into a fluid current enriched with ammonia and a fluid current enriched with water; the former current being preferably additionally compressed prior to being fed into the gas turbine 206. The hot water taken from the inner zone 5 cools down in the vaporizer and can be fed, e.g., via the pipeline 216, into a partial zone 28 of the outer zone 3 of the heat accumulator 1. The water thus heated first in the inner zone 5 can in turn be used for operating the multi-chamber heat accumulator after its use in the Kalina process. Depending on the temperature profile of the partial zones 28 of the outer zone 3 of the heat accumulator 1, the water cooled down in the Kalina process can therefore be fed into the respective partial zone depending on its temperature.

LIST OF REFERENCE NUMERALS

1 Multi-chamber heat accumulator
2 Pit structure
3 Outer zone
4 Soil
5 Inner zone
6 Bottom
7 Partition wall between inner and outer zone
8 Insulating layer of bottom 6
10 Sealing layer of bottom 6
12 Pit filling of the inner zone
14 Sidewall
15 Pit filling of the outer zone
16 Heat insulating layer of the sidewall
18 Sealing layer of the sidewall
20 Cover
21 Steam diffusion layer
22 Heat insulating layer
24 Insulation of the cover
26 Partition wall
28 Partial zone, chamber
34 Drain pipe, outlet pipe
36 Drainage protective layer
38 Protective layer
40 Spray pipe
42 Inlet pipe
46 Peripheral zone
50 Drainpipe
90 First pipeline system
100 Second pipeline system
102 Sections of the second pipeline system
104 Inlet of the second pipeline system
106 Outlet of the second pipeline system
108 Manifold unit
200 System for carrying out the Kalina process
202 Vaporizer
204 Separator
206 Gas turbine
208 Condenser
210 Cooling system
212 Compressor
214 Supply pipe
216 Discharge pipe All features represented in the description, the following patent claims, and the drawings can be implemented to achieve the invention both individually and in any combination with each other.

What is claimed is:

1. A multi-chamber heat accumulator for the storage of heat energy as well as for the generation of electrical energy, comprising:
a pit structure, comprising at least one bottom, one sidewall, and a cover, wherein the pit structure comprises at least one inner zone with a first solid matter pit filling and at least one outer zone with a second solid matter pit filling which at least partially surrounds the inner zone, wherein the pit filling of the inner zone is separated at least in parts from the pit filling of the outer zone by at least one partition wall, and wherein the inner zone further comprises at least one first pipeline system, the inner zone being heated by running fluid through said first pipeline system, with at least one inlet to the inner zone and at least one outlet from the inner zone for passing fluids through and which is embedded at least in sections in the material of the first pit filling of the inner zone, wherein the material of the first solid matter pit filling on an average, has a lower granulation than the second solid matter pit filling and comprises sand or a compact structure at least in parts.

2. The multi-chamber heat accumulator according to claim 1, wherein the outer zone comprises essentially incompressible granular and/or stone chippings-like material as a second solid matter pit filling.

3. The multi-chamber heat accumulator according to claim 1, wherein the first solid matter pit filling comprises incompressible granular and/or stone chippings-like material.

4. The multi-chamber heat accumulator according to claim 1, wherein the partition wall separating the inner and the outer zone from each other is fluid-tight so that essentially liquid fluids are not interchangeable between the inner and the outer zone.

5. The multi-chamber heat accumulator according to claim 1, wherein the inner zone contains at least one second pipeline system with at least one inlet to the inner zone and at least one outlet from the inner zone for passing fluids through, which is embedded at least in parts in the material of the first pit filling of the inner zone.

6. The multi-chamber heat accumulator according to claim 1, further comprising at least one system for carrying out a Kalina process, one first system for carrying out a closed gas turbine process to expand inert gases, and/or one system for carrying out an ORC process, in each case comprising at least one vaporizer, at least one gas turbine, at least one condenser, at least one compressor and at least one cooling system, in each case coupled with the outlet of the first and/or the second pipeline system by at least one supply pipe.

7. The multi-chamber heat accumulator according to claim 6, further comprising at least one discharge pipe which the supply pipe passes into downstream from the vaporizer.

8. The multi-chamber heat accumulator according to claim 7, further comprising at least one second system for carrying out a closed-loop gas turbine process to compress inert gases, heat them in a gas heater and expand them in a gas turbine stage, wherein at least one section of the discharge pipe and/or of the cooling system represents the gas heater of said second system.

9. The multi-chamber heat accumulator according to claim 1, wherein the second pit filling of the outer zone is subdivided into partial zones by at least two partition walls and/or at least one circumferential partition wall.

10. The multi-chamber heat accumulator according to claim 7, wherein the discharge pipe is connected with at least one inlet pipe of the outer zone or at least one partial zone of the outer zone.

11. The multi-chamber heat accumulator according to claim 1, wherein the bottom comprises at least one heat insulating layer and at least one sealing layer installed above the insulating layer, and wherein the sidewall comprises at least one inner sealing layer, and/or that the cover of the pit structure comprises at least one heat insulating layer and at least one sealing layer installed above the insulating layer.

12. The multi-chamber heat accumulator according to claim 11, wherein the heat insulating layer of the sidewall and/or the cover comprises at least one layer of adjacent, foamed bodies, particularly large-sized and/or closed-pore hard foam material blocks.

13. The multi-chamber heat accumulator according to claim 11, wherein the heat insulating layer of bottom comprises at least one layer of adjacent, foamed bodies, particularly large-sized and/or closed-pore hard foam blocks and/or at least one layer of mineral insulants made of foamed glass, swelling clay, and/or swelling slate.

14. The multi-chamber heat accumulator according to claim 1, wherein the partition wall for subdividing the outer ones zone comprises at least one wall of stone, concrete, metal and/or synthetic material, and/or a plastic foil, and that the partition wall between the inner and the outer zone comprises at least one wall of stone, concrete, and/or metal.

15. The multi-chamber heat accumulator according to claim 1, further comprising at least one fluid inlet pipe adjacent to the underside of the inner sealing layer of the cover for supplying fluid to the outer zone or to a partial zone of the outer zone and/or at least one fluid outlet pipe on the bottom, in said bottom, or adjacent to it, for drawing fluid from the outer zone.

16. The multi-chamber heat accumulator according to claim 9, wherein each partial zone of the outer zone has at least one outlet pipe and/or at least one inlet pipe.

17. The multi-chamber heat accumulator according to claim 1, wherein the outer zone at least in parts is positioned lateral, in each case lateral and below, or in each case lateral and above, in relation to the inner zone such that the outer zone surrounds said inner zone from all sides.

18. The multi-chamber heat accumulator according to claim 1, further comprising an essentially liquid-tight trough structure and/or membrane trough surrounding the pit structure to keep groundwater away from it, wherein the trough structure and/or the pouring between bottom and/or sidewall of the pit structure and the interior wall of the trough structure and/or the membrane trough comprises ballast material.

19. The multi-chamber heat accumulator according to claim 1, further comprising at least one operating and/or control unit comprising at least one circulating pump, one heat exchanger, and one inlet and one outlet, particularly a valve and/or spray pipe control.

20. A method for generating electrical energy, comprising:
providing a multi-chamber heat accumulator according to claim 1;
supplying energy to the inner zone via the first pipeline system by means of heated fluid passing through it so that the temperature of the inner zone amounts to at least 110 Celsius;
utilizing the thermal energy supplied to the inner zone and stored for vaporizing a work fluid or for vaporizing liquefied gases;
driving at least one steam turbine by means of the vapour developing in the process of evaporation of the expanding work fluid; and
transforming the kinetic energy of the moving steam turbine into electrical energy.

21. The method according to claim 20, wherein the utilizing the thermal energy, the driving at least one steam turbine, and/or the transforming the kinetic energy are constituents of a Kalina process or an ORC process.

22. The method according to claim 20, wherein the heated fluid used for the evaporation of the work fluid is supplied through at least one discharge pipe after leaving the vaporizer for the outer zone, with a temperature below that of the fluid to be fed in.

23. The method according to claim 22, wherein the cooling system or the discharge pipe is used to operate a closed-loop gas turbine process in which compressed and liquefied inert gases are heated up via the cooling system or the discharge pipe in liquefied and/or vaporized state and then expanded in a gas turbine stage.

24. The method according to claim 20, wherein the first pipeline system is used for supplying thermal energy to the inner zone while a second pipeline system is used for abstracting thermal energy from the inner zone for vaporizing the work fluid.

25. A method using the multi-chamber heat accumulator in accordance with claim 1 for the provision of thermal energy for the generation of electrical energy.

* * * * *

UNITED STATES PATENT AND TRADEMARK OFFICE
CERTIFICATE OF CORRECTION

| | | Page 1 of 1 |
|---|---|---|
| PATENT NO. | : 7,891,187 B2 | |
| APPLICATION NO. | : 11/776503 | |
| DATED | : February 22, 2011 | |
| INVENTOR(S) | : P. Mohr | |

It is certified that error appears in the above-identified patent and that said Letters Patent is hereby corrected as shown below:

| COLUMN | LINE | |
|---|---|---|
| 15 (Claim 14, line 3) | 21 | before "zone" delete "ones" |

Signed and Sealed this
Nineteenth Day of July, 2011

David J. Kappos
*Director of the United States Patent and Trademark Office*